No. 621,014. Patented Mar. 14, 1899.
G. A. BACHMANN.
PROCESS OF AND APPARATUS FOR EXTRACTING WORT FROM MASH.
(Application filed Apr. 15, 1898.)
(No Model.) 2 Sheets—Sheet 1.
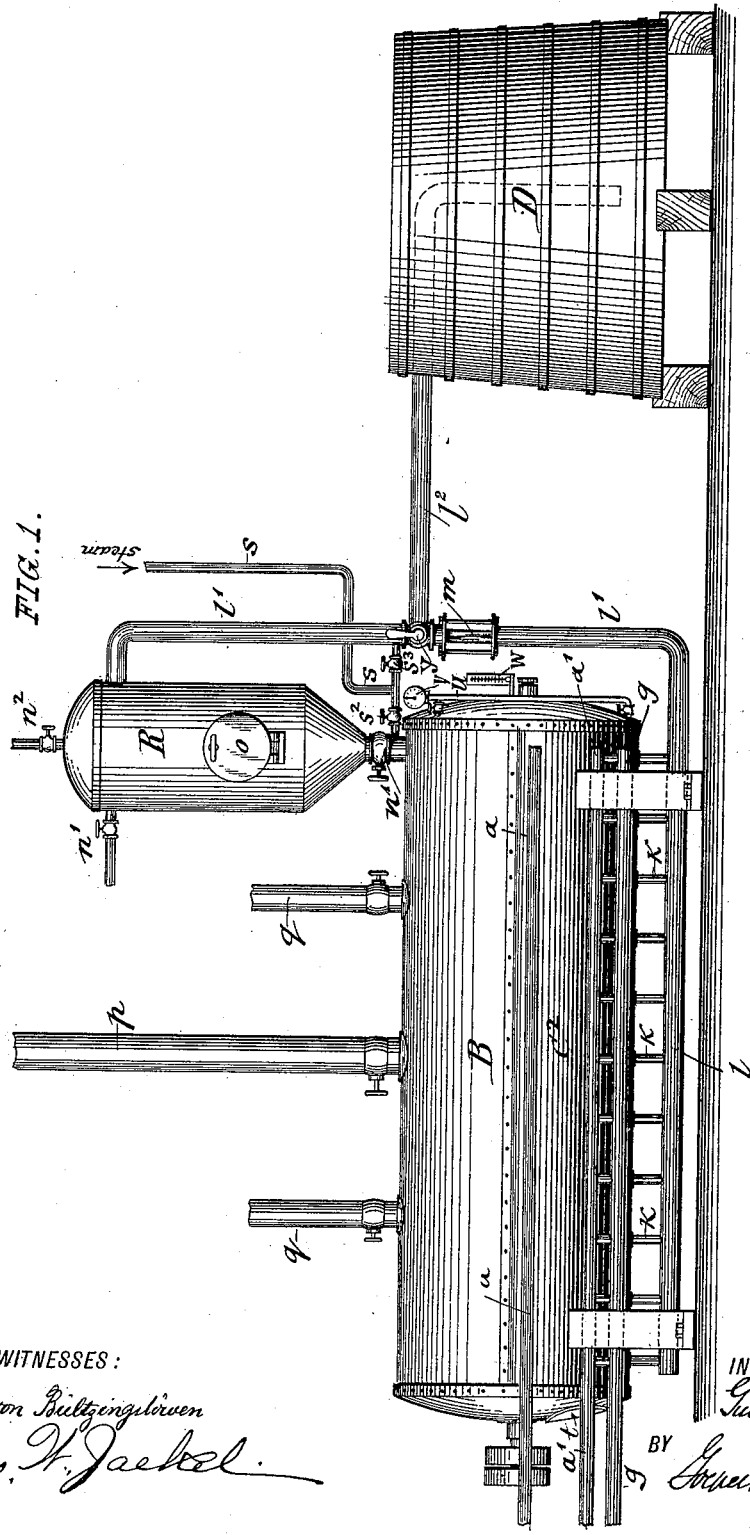

No. 621,014. Patented Mar. 14, 1899.
G. A. BACHMANN.
PROCESS OF AND APPARATUS FOR EXTRACTING WORT FROM MASH.
(Application filed Apr. 15, 1898.)
(No Model.) 2 Sheets—Sheet 2.
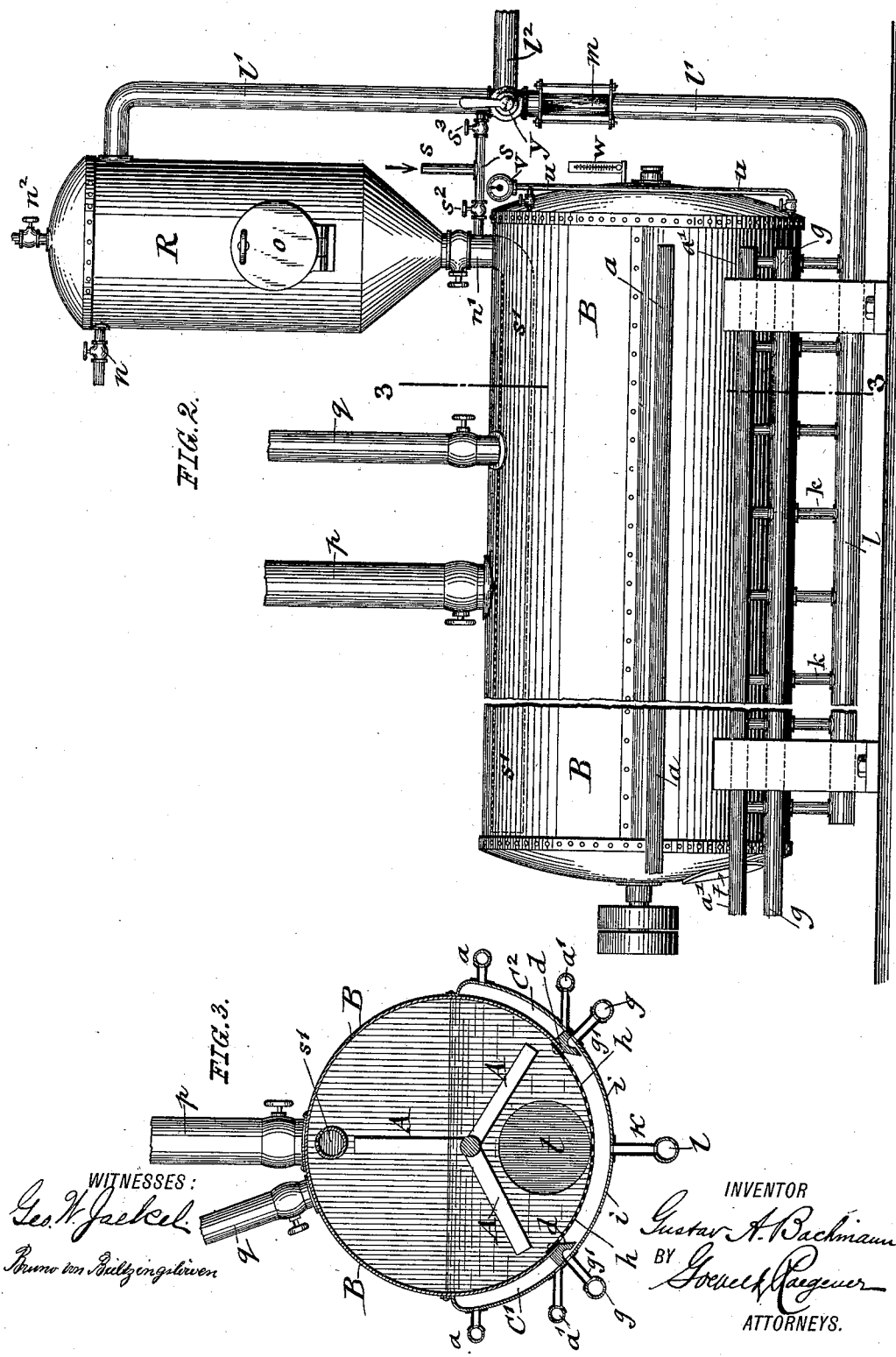
WITNESSES:
INVENTOR
Gustav A. Bachmann
BY
ATTORNEYS.

UNITED STATES PATENT OFFICE.

GUSTAV A. BACHMANN, OF BALTIMORE, MARYLAND.

PROCESS OF AND APPARATUS FOR EXTRACTING WORT FROM MASH.

SPECIFICATION forming part of Letters Patent No. 621,014, dated March 14, 1899.

Application filed April 15, 1898. Serial No. 677,685. (No model.)

*To all whom it may concern:*

Be it known that I, GUSTAV A. BACHMANN, a citizen of the United States, residing at Baltimore, in the State of Maryland, have invented certain new and useful Improvements in Processes of and Apparatus for Extracting Wort from Mash, of which the following is a specification.

This invention relates to an improved process of and apparatus for extracting wort from mash in such a manner that a greater percentage of starchy matter is extracted from the mash and converted into saccharine substance than has been possible with the means heretofore employed; and the invention consists, primarily, of a process of extracting wort from mash by subjecting it to direct steam-pressure acting on the surface of the mash.

The invention consists, further, of a process of extracting wort from mash by separating the wort from the mash by the pressure of steam on the surface of the same, then subjecting the remaining grains to several successive cooking operations and drawing off this secondary wort under pressure of steam, then mixing the products of the different extracting operations and cooling the same, and, lastly, saccharifying the cooled wort thus obtained.

The invention consists, secondarily, in an apparatus for carrying out the process just described, which apparatus will be fully described hereinafter and its new features finally pointed out in the claims.

In the accompanying drawings, Figure 1 represents a side elevation of my improved apparatus for extracting wort from grain. Fig. 2 is a side elevation of the extractor and receiver, drawn on a larger scale; and Fig. 3 is a vertical transverse section of the extractor on line 3 3, Fig. 2.

Similar letters of reference indicate corresponding parts.

In carrying out my improved process of extracting wort from mash the prepared mash is conducted into a cylindrical vessel or extractor B, which is made in any desired dimensions, according to the quantity of mash to be acted upon in one charge. The extractor B is provided at its opposite sides with steam-jackets $C'$ $C^2$, which extend throughout the full length of the extractor, said steam-jackets being connected with steam-pipes $a\,a$, through which steam is supplied to the upper parts of said steam-jackets, the water of condensation being conducted off from the lower parts of the same by means of pipes $a'\,a'$, connected therewith. The pipes $a\,a$ and $a'\,a'$ are located parallel with the axis of the extractor B and connected by a number of short pipes with the steam-jackets. When it is desired to cool off the contents of the extractor, cold water is forced through said pipes $a\,a$ and $a'\,a'$; but in this case the current is reversed, the cold water passing into the steam-jackets through the pipes $a'\,a'$ and leaving them through the pipes $a\,a$.

The outer walls of the steam-jackets are extended concentrically with the bottom of the extractor, so as to form an exterior bottom $i$ for the same. The bottom portion of the extracting vessel B between the steam-jackets C is perforated, so as to form a false bottom $h$. The outer bottom $i$ is connected at its lowermost part by a number of pipes $k$ with an outlet-pipe $l$. The space between the false bottom $h$ of the extractor B and the exterior bottom $l$ and the steam-jackets is separated by partitions $d\,d$ of inverted-U shape, one leg of each partition being made somewhat longer than the other leg, the longer legs serving as the partition-walls proper for the steam-jackets, while the shorter legs form a thin channel between them and the outer bottom $i$. The space in each partition $d$ is connected by short pipes $g'$ with hot-water-supply pipes $g$, so that hot water in thin sheets can be supplied over the inner surface of the exterior bottom $i$, by which any starchy matter that has settled thereon is washed off.

The wort is drawn off through the false bottom and the outlet-pipe $l$ by subjecting the mass in the extractor to the pressure of steam that is supplied to the same by a valved steam-pipe $s$, which is connected with an interior distributing-pipe $s'$, arranged at the upper part of the extractor B. The pipe $s'$ is provided at its upper portion with several rows of perforations, as shown in Fig. 3, so that the steam that escapes from them impinges against the upper part of the extractor and is distributed along the wall of the same, so as to fill the space above the mash and act on the surface of the same, forcing the wort through the false bottom to the outlet-pipe $l$. The wort is strained by its passage through the false bottom and forced by the interior pressure in the extractor through the outlet-pipe $l$ and upwardly-bent pipe $l'$ into a cylindrical receiver R, that is supported above the extractor and connected by a valved pipe $n'$ at its lower part with the distributing-pipe $s'$. The upwardly-extending pipe $l'$ is provided with a sight-glass $m$, through which the condition of the wort in its passage through the pipe can be observed. The pipe $l'$ is provided above the sight-glass $m$ with a three-way cock $y$ and a laterally-extending branch pipe $l^2$, so that the clear wort can be conducted into a suitable saccharifying vessel or converter D, (shown in Fig. 1,) in which the wort that is successively extracted from the mash is collected.

The receiver R is preferably made cylindrical in shape and has a lower tapering part which is connected by the short pipe $n'$ with the extractor B. A valve is arranged in the connecting-pipe $n'$. The steam-pipe $s$ is connected by a branch pipe having a stop-cock $s^2$ with the connecting-pipe $n'$ and by a second branch pipe having a stop-cock $s^3$ with the pipe $l'$ above the three-way valve $y$, as shown in Fig. 2. The receiver R is provided with a manhole and manhole-cover $o$, so as to permit the convenient cleaning of the receiver. The size of the receiver R is in proportion to the size of the extracting vessel B. The extractor B is provided with one or more valved uptakes $p$, through which the steam is conducted off when the mash is cooked in the extractor. The extractor is further provided with one or more valved supply-pipes $q$, through which the mash or other material is conducted into the extractor. An agitator A is arranged in the extractor, the shaft of said agitator being supported in suitable bearings in the heads of the extractor and provided with a number of stirrer-arms for working up the mash in the extractor. The agitator has a twofold purpose—first, for preparing the mash in case the mashing process is carried out in the extractor, in which case the agitator is rotated at a higher speed, and, secondly, for removing the grains from the extractor, in which case a slower speed is imparted to the agitator, so that the stirrer-arms move gradually the grains from one end of the extractor to the discharge-opening $t$ at the other end, said discharge-opening being closed by a suitable cover. One end of the shaft of the agitator A is passed through the head of the extractor to the outside and driven by a belt-and-pulley transmission from a suitable power-shaft. The opposite head of the extractor B is provided with a gage $u$ for indicating the height of the liquor in the extractor B and with a pressure-gage $v$. The upper end of the gage $u$ is connected with the upper part of the extractor, while the lower end is connected with the space between the false bottom and the exterior bottom $i$. A thermometer $w$ is connected with the interior of the extractor through the head of the same, the thermometer being so arranged that it cannot be interfered with by the stirrer-arms of the agitator. A valved supply-pipe $n$ at the upper part of the receiver R serves for supplying hot water to the receiver. This is transferred into the extractor B by closing the steam-cock $s^2$, supply-pipe $n$, and vent-pipe $n^2$ at the upper end of the receiver, and then opening the valve in the connecting-pipe $n'$ and the steam-cock $s^3$. When this is accomplished, an equilibrium of steam-pressure in the extractor and receiver is established and the hot water in the receiver transferred into the extractor. When it is desired to fill the receiver again with hot water, the valve in the connecting-pipe $n'$ is closed, also the steam-cocks $s^2$ and $s^3$, and the supply-pipe $n$ and vent-pipe $n^2$ at the upper part of the receiver are opened.

My improved apparatus is used as follows for extracting the wort from the mash: The mash is prepared in the usual manner, either in a separate mash-tun, from which it is conducted into the extractor, or in the extractor itself, but with the advantage that in the latter case a considerably finer-ground grain can be used for the mash. As soon as the mashing process is completed, so that a test made with a solution of iodin and iodide of potassium in water does not show the well-known reaction indicating the presence of starch, the mash is transferred into the extractor and permitted to settle in the same for from ten to fifteen minutes. The three-way cock $y$, which was closed, is then set so that the pipe $l'$ is connected with the receiver R. The vent-pipe $n^2$ of the receiver R is then opened. All the other valves are closed. The steam-cock $s^2$ is then slowly opened and the steam gradually supplied, through the connecting-pipe $n'$ and the steam-pipe $s'$, to the interior of the extractor. As soon as a sufficient steam-pressure is established in the interior of the extractor the steam, acting on the entire surface of the mash, forces the wort in a downward direction through the false bottom and into the pipe $l$ and through the pipe $l'$ into the receiver. Simultaneously with the opening of the steam-cock $s^2$ water having a temperature of about 167° Fahrenheit is supplied through the pipes $g$, which water is passed in thin sheets over the inner surface of the bottom $i$, so as to wash off the starchy sediment collected thereon and transmit it to the outlet-pipe $l$. After a short time the supply of water in the pipes $g$ is interrupted and the wort rising in the pipe $l'$ observed at the sight-glass $m$. As long as the wort is turbid the three-way cock remains in the position in which it is set; but as soon as the wort runs clear the three-way cock $y$ is turned so as to establish communication between the extractor and the saccharification vessel D, in which the wort extracted from the mash is gradually collected. After this is accomplished the vent-pipe $n^2$ is closed, also the steam-cock $s^2$, and the steam-cock $s^3$ and the valve in the connecting-pipe $n'$ opened, so that the turbid contents of the receiver are transferred into the extractor. The higher the steam-pressure in the extracting vessel the quicker will the wort be separated from the mash, and the lower the pressure the slower will it be separated. As soon as the wort has been drawn off from the grains, which can be readily observed in the gage-glass $u$, the three-way cock $y$ is closed, likewise the steam-cock $s^3$ and the valve of the connecting-pipe $n'$, while the vent-pipe $n^2$ is opened, also the uptake $p$. Boiling water is then supplied through the pipes $g$ or $l$ to the interior of the extractor. The agitator is then started, so that the boiling water is thoroughly mixed with the remaining grains. When a sufficient quantity of water has been supplied to the extractor, steam is either supplied to the steam-jackets or permitted to enter directly into the extractor through the pipes $g$ $g$, so that the supplementary mashing process can be carried on indirectly or directly with live steam. When the mass is boiling, the agitator can be stopped. After cooking for about ten to twenty minutes the supply of steam is shut off, likewise the uptake $p$. The mass is then permitted to settle for from ten to fifteen minutes, after which the extracted wort is drawn off by direct steam-pressure in the same manner as before described and transferred into the saccharification vessel to the wort in the same. After this the different valves are set in such manner that boiling water can be again supplied to the remaining grains. After a sufficient quantity of boiling water has been introduced in the extractor and agitated with the grains at the boiling temperature the mass is permitted to rest for from ten to fifteen minutes, after which the extracted wort is again drawn off in the same manner as before by direct steam-pressure on the surface of the mash and transferred into the saccharification vessel, to the first and second wort in the same. A final washing of the grains is then produced by filling the receiver with boiling water and transferring the boiling water from the receiver into the extractor. This is then drawn off under steam-pressure through the extractor in such a quantity that the required quantity of wort in the saccharification vessel is obtained. The last operation of washing out the remaining grains can be repeated several times, if required, until all the starch in the grains is completely extracted. The wort which is obtained by these different extracting operations is then cooled in the saccharification vessel D to a temperature between 140° Fahrenheit and 178° Fahrenheit, 156° Fahrenheit being preferable. After the cooling operation is accomplished a solution of diastase is added to the wort, the diastase solution being prepared from malt-flour and cold water, so as to facilitate the complete saccharification of the starch extracted from the mash by the primary and supplementary extracting operations. The wort is retained for a sufficient length of time at its saccharification temperature until the complete saccharification has taken place—that is to say, until a solution of iodin and iodide of potassium in water does not indicate the presence of starch in the solution. After the wort is completely saccharified it is treated in the same manner as in the ordinary brewing process.

By my improved process the various worts are separated from the mash before saccharification can take place. This is secured by maintaining a high temperature in the extractor during the various supplementary extracting operations. The steam used in each extraction serves not only as a pressure medium, but imparts its heat to the body of the grain, and thereby neutralizes to a large extent the cooling produced when the turbid contents of the receiver, the temperature of which has fallen slightly below that of the mash during the extracting operation, are transferred to the extractor.

Having thus described my invention, what I claim is—

1. The process herein described of separating wort from mash, which consists of the following successive steps: subjecting the mash to direct steam-pressure so as to draw the wort off from the mash, separating the turbid from the clear wort, adding the said turbid wort to the remaining grains, subjecting the same to a cooking operation, separating the thus-obtained wort under direct steam-pressure from the grains, separating the turbid from the clear wort, adding said turbid wort to the remaining grains, cooking the same with boiling water, drawing off the wort thus obtained by direct steam-pressure, separating the turbid from the clear wort, cooling the entire wort obtained by the different separating operations to the saccharification temperature, and lastly saccharifying the starch contained in the wort by the addition of a diastase solution, substantially as set forth.

2. In an apparatus for extracting wort from mash, the combination of a steam-jacketed extractor, having a false bottom and an outer bottom below said false bottom, a perforated distributing-pipe at the upper part of the extractor, pipes for supplying hot water or steam to the lower part of the extractor, a receiver above the extractor connected with the distributing-pipe, an outlet-pipe connecting the lower part of the extractor with the upper part of the receiver, a branched steam-supply pipe connected with the distributing-pipe and the outlet-pipe, and valves on the receiver and in the connecting-pipes for establishing or interrupting the connection of the extractor with the receiver, substantially as set forth.

3. The apparatus herein described for separating wort from mash, which comprises a steam-jacketed extractor, a false bottom at the lower part of the extractor, an outer bottom below the false bottom, supply-pipes for hot water or steam connected with the lower part of the extractor, a receiver above the extractor, an outlet-pipe connected with the lowermost part of the extractor, a pipe connecting the outlet-pipe with the upper part of the receiver, a saccharification vessel, a pipe connecting the outlet-pipe with the saccharification vessel, a three-way cock at the junction of said pipes, a perforated distributing-pipe at the upper part of the extractor, connected with the receiver, a steam-supply pipe connected with said distributing-pipe and pipe leading to the receiver, and valves for establishing or interrupting the connection of the extractor with the receiver, substantially as set forth.

4. In an apparatus for separating wort from mash, an extracting vessel provided with steam-jackets along its sides, U-shaped separating partitions between the steam-jackets and the lower part of the extractor, a false bottom above the outer bottom of the extractor, and pipes for supplying hot water or steam to the U-shaped partitions, said partitions being provided with shorter legs forming narrow channels for permitting the washing of the starchy sediments from the inner surface of the exterior bottom with hot water, substantially as set forth.

5. In an apparatus for separating wort from mash, an extracting vessel provided with a valved supply-pipe for the mash, and a valved uptake, an agitator at the interior of the vessel, a false bottom above the outer bottom, steam-jackets at opposite sides of the extractor, partitions of inverted-U shape between the steam-jackets and the space below the false bottom, hot-water pipes for supplying the space below the false bottoms with hot water through the U-shaped partitions, a perforated steam-supply pipe at the upper inner part of the extractor, and an outlet-pipe connected with the lowermost part of the same, substantially as set forth.

In testimony that I claim the foregoing as my invention I have signed my name in presence of two subscribing witnesses.

GUSTAV A. BACHMANN.

Witnesses:
PAUL GOEPEL,
GEO. W. JAEKEL.